Jan. 28, 1941.　　　O. J. L. SEAMAN　　　2,229,678
APPARATUS FOR PRODUCING COMPOSITE PHOTOGRAPHS
Filed Dec. 23, 1937　　　3 Sheets-Sheet 1

INVENTOR
Otto John Lauro Seaman,
BY
Tracey, Meyers & Manley
ATTORNEYS.

Jan. 28, 1941.　　　O. J. L. SEAMAN　　　2,229,678
APPARATUS FOR PRODUCING COMPOSITE PHOTOGRAPHS
Filed Dec. 23, 1937　　　3 Sheets-Sheet 2

INVENTOR
Otto John Lauro Seaman,
BY
Frans, Nyris & Manley
ATTORNEYS.

Jan. 28, 1941.                O. J. L. SEAMAN                2,229,678
            APPARATUS FOR PRODUCING COMPOSITE PHOTOGRAPHS
                     Filed Dec. 23, 1937        3 Sheets—Sheet 3
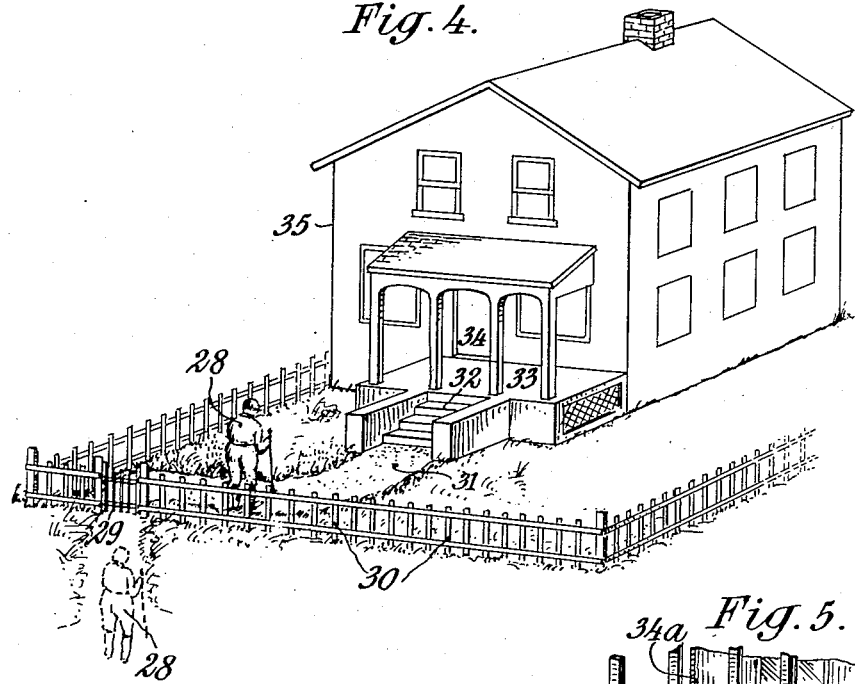
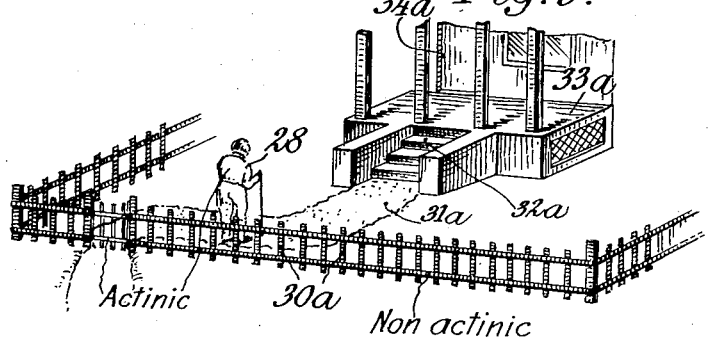
 
INVENTOR
Otto John Lauro Seaman,
BY
Fraser, Myers & Mowry
ATTORNEYS.

Patented Jan. 28, 1941

2,229,678

UNITED STATES PATENT OFFICE 2,229,678

APPARATUS FOR PRODUCING COMPOSITE PHOTOGRAPHS

Otto John Lauro Seaman, Bayside, N. Y.

Application December 23, 1937, Serial No. 181,251

6 Claims. (Cl. 88—16)

This invention relates to the composition, in a single photograph, of parts of two or more scenes which may have been separately photographed at different times and places; and in its more particular aspects, to improvements in apparatus for practicing a "masking process" of photographic composition.

The principal object of the invention is to provide for the composition of separately photographed scenes with complete and accurate registration of the different parts and proper location and proportion between them to create a realistic illusion that the result is a photograph of a single scene; and along with this to provide for the solving of composition problems of widely varying and complex nature.

It is another object of the invention to provide for the simultaneous exposure of a pair of films to produce identic images on them of an action scene, one of which, after development, may be used as a mask for the latent image on the other and undeveloped film; for the comparison of the developed mask with an image of the background so that proper proportion and perspective may be established between the two; and for the accurate shadowing of the latent action image on the undeveloped film during an exposure of that film to the image of the background all to the end that clear practical compositions, without fringing and fuzzing, may be effected.

It is a further object of the invention to provide apparatus for practicing a "masking" composition process, wherein an aerial image of the background scene may be viewed through a "masking" film lying in the plane of that image and carrying a silhouette of the foreground or action scene, so that proper proportion and location of the foreground with respect to the background scene may be established, and wherein the film bearing a latent image of the foreground scene may then be exposed to the aerial image of the background through that masking film.

It is a further and more specific object of the invention to provide a camera for use in producing composite photographs having means for dividing light passing through a defined primary image focal plane and through a collecting lens system, and for directing it along two or more substantially identical paths, all of which may be used, at times, to produce substantially identical photographic exposures of an action or foreground scene, and at other times, one for viewing an image of the background scene lying in the primary focal plane through a film also lying in that plane and bearing a silhouette of the action so that proper proportion may be established between them, and the others for subsequently exposing films carrying latent images of the action to the image of the background through the film bearing the silhouette.

The full nature of the invention along with other objects and features thereof wil be more fully understood from the following description and a consideration of the accompanying drawings, in which:

Fig. 4 illustrates a scene which may be composed from parts of separately photographed other scenes in accordance with the principles of the present invention.

Fig. 5 is a view of a non-actinic set before which foreground scenes, later to be inserted into the background ones, may be taken.

Figs. 6 and 7 illustrate the various films utilized in different parts of the composition.

The process with the practicing of which the present invention is primarily concerned may briefly be described as comprising the steps of making identical exposures of a foreground or action scene on two separate films against a non-actinic set; the development of one of these films without the development of the other; the placing of the developed film in the plane of an image of the desired background, and also in a position such that the shadow cast by its substantially opaque image exactly overlies and masks the latent image on the undeveloped film; the splitting of light passing through this plane of the image of the background and developed film into two substantially identical paths; the use of one of these paths for viewing the image of the background through the developed image of the foreground, so that a proper proportion may be established therebetween; and finally, the use of the other path to expose the other, and undeveloped, film to the image of the background through the developed mask.

A process of this kind is equally applicable to the composition of either still or motion pictures, but since its main use will be in connection with the latter, the invention is hereinafter described with particular reference to the making of motion pictures.

Figure 1:
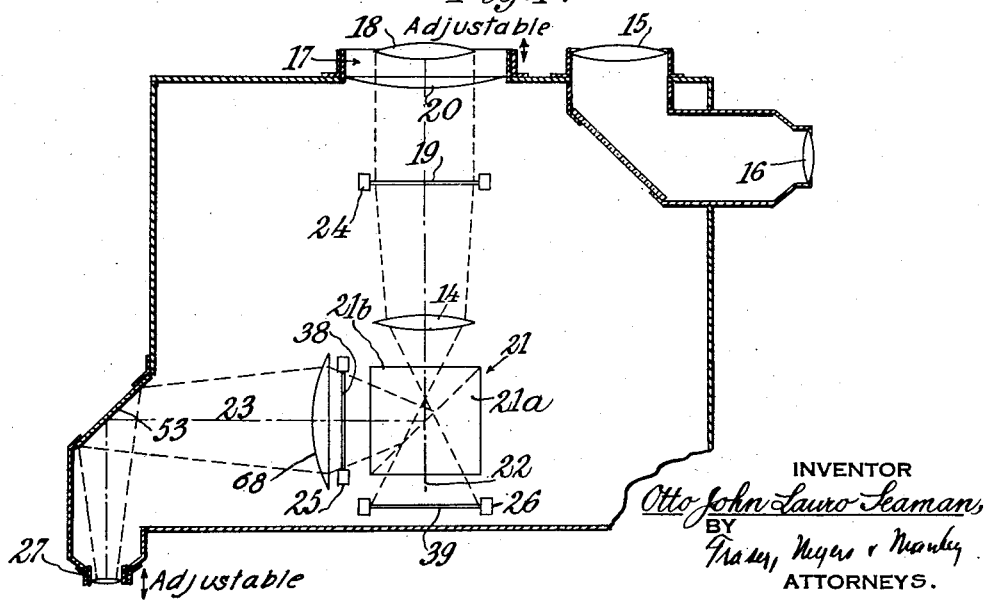
Figure 1 is an optical diagram of a camera embodying the principles of the present invention.

In practicing the method it will be found desirable to use a camera embodying the principles of the present invention, which, as illustrated diagrammatically in Fig. 1, has the usual finder aperture 15 provided with appropriate lenses and an eye piece 16; a primary lens aperture 17 provided with a lens system 18 of such character as to be capable of casting an aerial image on the focal plane 19 of the camera; a field lens 20 which is here shown as a part of the primary lens system; a copying lens 14; a light splitting device 21 capable of dividing light passing through the focal plane of the camera and directing it along two substantially identical optical paths 22 and 23; three film gates 24, 25 and 26, located respectively in the primary image focal plane of the camera, and in the light paths 23 and 22, at equal distances from the optical center of the light splitting device and at secondary image focal planes, these distances being such that the images on the films carried in the gates 25 and 26 will be substantially identical with the image formed on a film carried in gate 24; a second viewing aperture provided with an eye piece 27 located, preferably, in the optical path 23 at some point beyond the plane of the film gate 25; a condensing lens 68 between the film gate 25 and the eye piece 27; and appropriate shutters (Figs. 2 and 3) for the apertures 17 and 27, and for the film gate 26.

With that camera, a pair of films in the gates 25 and 26 may be exposed simultaneously to an action scene which is presented before a non-actinic set for the purpose of producing the two substantially identical photographic images of the action referred to in the foregoing brief description of the process. The film in gate 25 may then be removed from the camera, without disturbing the one in gate 26, and after appropriate development, may be replaced, this time, however, in gate 24, not gate 25. The exposure of the foreground having been completed, the camera may be set in position before a background scene, and the eye piece 27 and light path 23 may be used to examine an image of the background through the developed film in gate 24. If the foreground and background objects in the resulting composite image are in any way disproportionate, that may readily be corrected by a manipulation of the primary lens system 18, or by a shifting of the position of the camera. Once any desired proportion has been obtained, the film in gate 26 may be exposed to the image of the background through the developed film (with the opaque image on the latter masking the latent image on the former) and upon removal from the camera, and development, it will be found to bear a composite image of the objects of both the foreground and background scenes.

The advantages of the new process, and of the camera for practicing it, may be comprehended more fully by a consideration of a practical composition problem. For this purpose it will be assumed that the scene of Fig. 4 represents the desired final result, and that in producing it the movements of the actor 28 were photographed at one time, and were then superimposed upon a desired background scene in such fashion that the actor appears to open and pass through the gate 29 to walk behind the fence 30, up the path 31, to mount the steps 32 and walk across the porch 33 behind the various posts and other obstacles, and to enter the doorway 34 and disappear into the house 35. The problem then involves not the simple one of merely inserting one scene entirely in front of another, but the much more complex situation wherein an actor first passes in front of the background, then behind parts of it, and finally appears to enter and disappear behind certain objects of the latter scene.

In composing such a scene the action, or foreground, objects are photographed against a non-actinic set so that the film used in making these exposures will be affected only by light reflected from the object—not by any light reflected by the set itself. If, as in the assumed problem the actor will at any time pass behind objects of the actual background, then these objects or the portions of them which obscure the figure of the actor should be present in the non-actinic set, or in the camera in film gate 24 in the form of a mask, for although they will reflect no light and hence will not effect a photographic exposure, they will cut off light reflected from the actor whenever they intervene between him and the camera. Further, those objects of the background which are to be moved by the actor, must be treated as a part of the action scene—not as background material. In the illustrated case, the gate 29 in the fence 30, is such an object. It will, accordingly, be photographed against the non-actinic background along with the movements of the actor during the action exposure. Correspondingly, the gate will be omitted from the background when the scene is added to the previously exposed action one.

The first step in the process, then, involves the preparation of an appropriate non-actinic set such as that shown in Fig. 5. This work, of course, must be done with the greatest of care so that the fence 30a, the porch posts, and the other background objects, will correspond exactly in size, proportion and location with reference to each other, to the like parts of the desired background, if the figure of the actor is to be in normal proportion to them. If the figure of the actor is to be of abnormal proportion, the size, proportion and location with reference to each other of these objects must all vary in exact inverse ratio to the increase or decrease in the actor's size. For example, if the figure is to appear larger, the objects must be made smaller, and vice versa. The foregoing rules apply also to masks in the camera used for a like purpose. Precision is essential at this point for any inaccuracy of execution will certainly be reflected in the final composite picture; and it is with this precision that the present invention is primarly concerned. While the construction may be based on calculation in the manner now prevalent, better results can be obtained by using a "comparative" method. That method, as its name suggests, involves a comparison of the proposed set and the objects which it contains with the background scene—or rather with a photograph of that scene. As a prerequisite to the construction of the set, then, it is necessary to secure such a photograph. In accordance with the preferred method that is done by placing a camera of the type shown in Fig. 1, before the actual background, or before a painting, photograph or model of it, and carefully adjusting the camera, and its lenses, until a desired view is obtained. After noting the position of the camera, and its lens system setting, a film is exposed, and upon development, the resulting photograph of the background scene is placed in the camera in film gate 24.

With these preliminary steps completed, the camera is placed before the proposed set in a position corresponding to the one from which the photograph was made; and an actor, or his measurements, is viewed on the proposed set through light path 23 against the photograph of the background. If the image of the actor does not appear in desired proportion to the background objects, and that desired proportion may be either natural or unnatural, then the camera may be moved towards or away from the proposed set, or the lens setting may be changed, until a proper relation is secured. Then, with the camera, and its lenses, held in the adjusted position, the construction of the set may constantly be checked against the photograph so that the size and shape of its contained objects may conform exactly to the like parts of the background as viewed through the photograph. In this way, the background effect may be exactly duplicated in the non-actinic set with a minimum of effort—by comparison rather than by calculation. During this comparison the set must, of course, be actinically illuminated. That, however, constitutes no real obstacle for the comparison can either be made before the set is treated with a substance which will not reflect light to which the photographic emulsion is sensitive, or it may be viewed in one light which the objects will reflect, and then be photographed (at a later time) in a light which they do not reflect to the camera.

Figure 3:
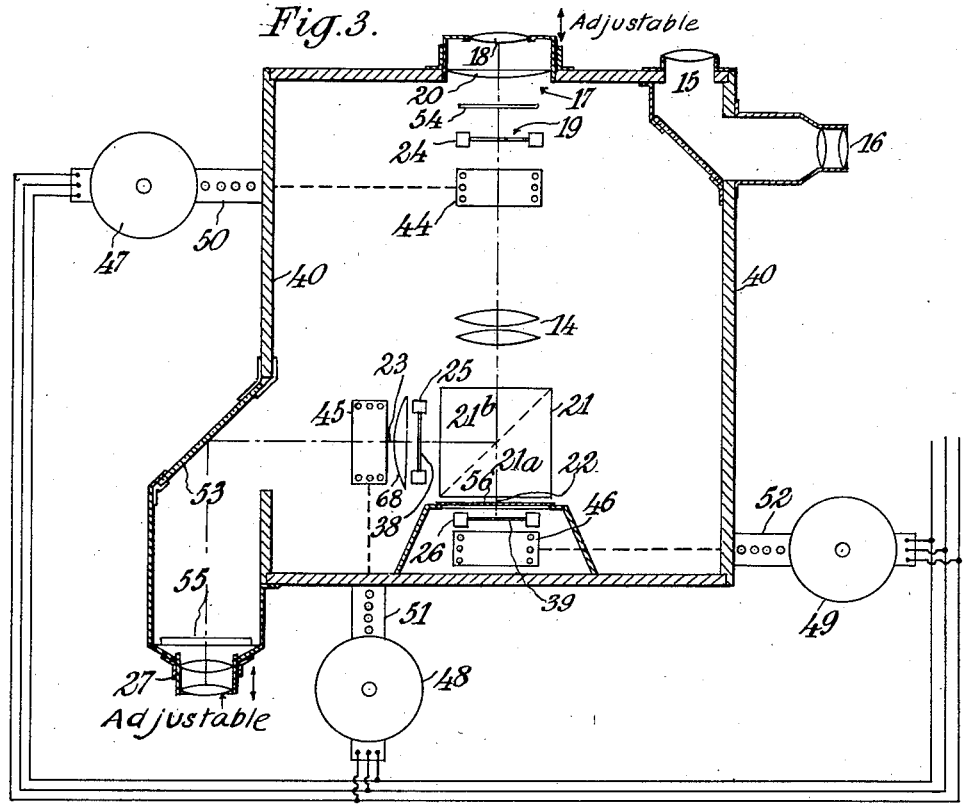
Fig. 3 is a plan view, in section, of the camera of Fig. 2.
Figure 2:
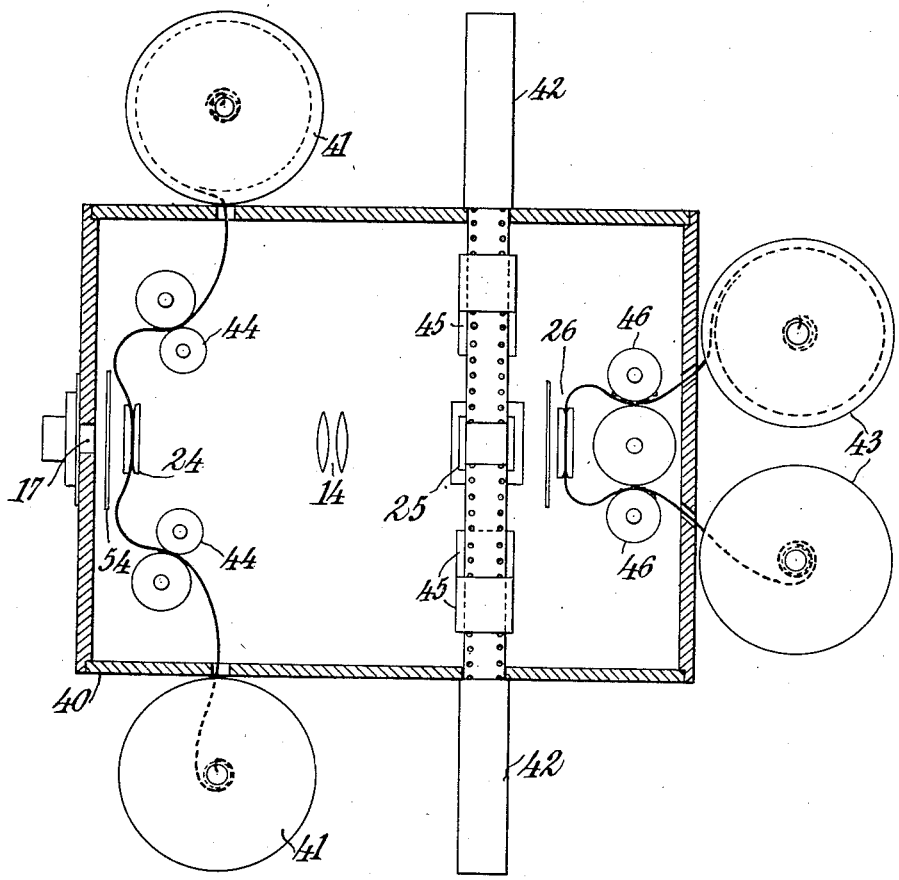
Fig. 2 is an elevational view, in section of a practical embodiment of such a camera, although several parts are indicated diagrammatically.

After the preparation of the set in the manner above described, the photograph of the background is withdrawn from film gate 24, the shutter 55 for the eye piece 27 is closed, and new strips of film 38 and 39 are placed in the film gates 25 and 26, respectively, of the camera of Figs. 1, 2 and 3 which is assumed to be properly located in front of the non-actinic set. The actor is then directed through his movements, and, as above mentioned, passes across the set through the gate, which, as a part of the action is actually illuminated, in the fence, and up the path, mounts the steps, etc. In so doing, the films 38 and 39 are simultaneously exposed, due to the presence of the light splitting device, to whatever light is reflected from his person and the gate 29, and not interrupted by the intervening non-actinic background objects. Specifically, as he enters the gate 29, all of the light reflected from his body and the gate will affect the two films in question, but as he passes through and behind the non-actinic fence, the palings thereof will cut off the light from parts of his body, and thus leave corresponding parts of the film entirely unaffected.

When the action has been completed, the shutters 54 and 56, respectively, are closed, and the film 39 is rewound without removing it from the camera. The other film 38 is withdrawn and developed to such extent that the image thereon becomes completely opaque, that is to say, nothing more than a mere silhouette of the actor against a clear background. This may be achieved in one of several ways, to wit, the film 38 may have been photographically faster than that indicated at 39, the light splitting device 21 may have been designed to pass more light through the path 23 than through path 22, a color separation process may be used, or it may be achieved by a simple chemical treatment, such as intensification, of the film in question. Any shrinkage or swelling in the film due to the development process or chemical treatment which causes a difference in size between films 38 and 39 must be corrected at this stage by a treatment of either or both films. In any event, as has been said, the parts of the film which were exposed become substantially opaque, and the unexposed parts are perfectly clear.

One particular frame of this developed film will then appear substantially as shown in Fig. 6. There it may be noted that the actor at the time of exposure was passing behind the fence, and accordingly those parts of his legs which would be visible to an observer through the palings of the fence appear on the film, whereas those parts which were shadowed, so to speak, by the palings, are perfectly clear. A corresponding frame of the undeveloped film 39 would then bear an identical latent image, except in so far as the actor appears to be reversed, right for left, as shown in Fig. 7.

So much for the preparation of the action parts of the picture. The next step, of course, involves the insertion or superpositioning of these action scenes in their proper places against the desired background. This is one of the most important steps in the entire method. Accuracy of location is an essential point in the production of a satisfactory composite picture, and it may be attained or lost here. In this step the camera of Fig. 1, still containing undeveloped film 39, is set up in front of the actual background scene, or the painting, photograph, or model of it, as the case may be, in exactly the position with reference to that scene, and with the same lens setting in aperture 17 that were noted previously when taking the photograph of that scene for comparison purposes. It has been found advisable to have these factors noted on a slate which is photographed on the strip of film which contains the photograph used for comparison purposes. As a further check on position, it is also advisable to recheck these factors by replacing the comparison film in film gate 24 and examining the background scene through its own photograph. This photograph is then removed and the developed masking film 38 is then inserted in the film gate 24, with the frame in film gate 24 corresponding with the frame in film gate 26, and by viewing it through the eye piece 27 and light path 23 against the aerial image of the background, the observer can get an actual view of the composite scene which he is trying to produce, i. e., he can see a real image of the background with silhouettes of the foreground action inserted therein. If, when he views the composite image, the background objects appear too large with respect to the foreground ones, so that the palings of the fence, for example, do not register exactly with the clear space on the actor's legs, then by adjustment of the position of the camera, or a manipulation of the primary lens system 18, he can reduce the size of the background objects, as they appear in the image, until proper registry is obtained.

In making any of these adjustments, however, it is to be noted that the relative positions of the primary focal plane of the camera, and of the masking film which is held therein by the film gate 24, are in no way changed with respect to the position of the undeveloped film 39 in the gate 26. The masking film is still in exactly the same position as was the aerial image to which this film, and the film 39, were originally exposed. Accordingly, any light passing through the masking film must cast a shadow on the film 39 of such proportions as exactly to mask the latent image which it bears.

If the shutter 55 for the eye piece 27 be now closed, and that (56) for the film gate 26 opened, the film 39 will be exposed to the image of the background through the masking film, and only those parts surrounding the latent image will be photochemically affected. Hence, when it is removed from the camera and developed, it will be found to bear a composite picture which includes both the foreground and the background objects; and will look, according to the assumed conditions, like the scene shown in Fig. 4.

In practicing the process with the camera of the present invention in the manner above described, only two films, 38 and 39, are essential, although a third one may conveniently be used to assist in the solving of location and proportion problems incident to the preparation of the non-actinic set. At most, then, only three exposures need be made, and only three developments and printings had. More important than that, however, is the fact that accurate results can be obtained even with composition problems of a very complex nature. This, it is believed, flows from the fact that the various images incident to the process may be viewed through the actual light paths which are used to effect the photographic exposures; and from the fact that the actual objects and photographic images are subject to repeated comparison and correction.

A camera embodying the principles shown diagrammatically in Fig. 1 is illustrated in more detail in Figs. 2 and 3. There it may be seen to comprise a casing 40 having a primary lens aperture 17 and appropriate lenses 18 and 20 capable of producing an aerial image in the focal plane 19; a copying lens 14 so constructed as to be capable of producing unit magnification of the aerial or real image at the primary focal plane 19 upon the secondary focal planes represented by the films in gates 25 and 26; a light splitting device 21, comprising a pair of prisms 21a and 21b, joined together along their respective hypotenuses with a partially reflecting metallic surface or other means therebetween so as to be capable of transmitting part of the light striking their surfaces along the path 22, and further capable of reflecting the remaining part of the light along the light path 23. Each of the film gates 24, 25 and 26, has appropriate pairs of film reels 41, 42 and 43, respectively, and appropriate feed mechanisms 44, 45 and 46, for the film passing therethrough. The feed mechanisms are synchronously driven in any desired way. As here shown, and it is intended to be illustrative only, each mechanism is provided with a motor 47, 48 and 49, respectively, which is preferably, though not necessarily, of the synchronous type, and the three motors are arranged on a common line so that each will operate precisely in step with the others. Further, the shaft of each of these motors carries a precision frame counter 50, 51 and 52, respectively, of well known type, which is intended to serve as an aid to an operator in achieving synchronization of the various frames of the different films used in practicing the composition process.

The viewing aperture 15, and its eye piece 16, are of conventional design. For this reason the structure has not been shown in great detail. The second viewing aperture is located in the side wall of the camera casing and its eye piece 27 lies in an extension of the light path 23 at a point beyond the film gate 25. A mirror 53 may be interposed in this extension of the path 23 as shown for the purpose of reversing, right for left, the images cast thereon, and thus correcting the original reversal caused by reflection from the surfaces of the light splitter. The eyepiece 27 is adjustable so that when the image is in focus at 19, the image viewed through 27 will also be in focus.

The shutters for the primary lens aperture 17, and the second viewing aperture are shown respectively at 54 and 55, while that for the film gate 26 is indicated at 56.

The exact constructional details of the camera are not here important for it may be made in just the way comparable precision motion picture cameras are now built, and may include certain other features not here relevant. The drawings are merely illustrative of the new features of the camera, and those which are essential to the practicing of the method.

In the foregoing it has generally been assumed that the background is relatively stationary with respect to the actor, and that is generally so. It need not be, however. For example, the background may comprise the view seen through a train window as an actor passes down the aisle of the car. In that case both the actor and the background are relatively moving, but the process is fully applicable to such a composition problem.

The process has further been described only in connection with "black and white" photography, but as will readily be evident to those skilled in the art, its principles may be applied to color work.

Since certain changes may be made in the invention and in the way of practicing it without departing from the principles thereof, it is intended that the foregoing shall be construed in a descriptive rather than in a limiting sense.

What I claim is:

1. A camera adapted for use in producing composite photographs comprising a casing having a primary aperture therein, an objective lens system in said aperture, a first film gate located in the focal plane of said lens system, a copying lens located on the optical axis of said objective lens system at a point behind said first film gate, a light splitter located behind said copying lens and on its optical axis, a second film gate located in the path of light transmitted by said splitter, a third film gate located in the path of light reflected by said splitter, said second and third film gates being located at such optical distances from said splitter that each lies in the plane of an image produced by said copying lens, said casing having a viewing aperture in one of its walls located in one of the light paths from said splitter at a point beyond the film gate in that path through which images produced by said copying lens may be viewed, and means for interrupting the passage of light to said second and third film gates when desired.

2. A camera for use in producing composite photographs comprising a casing having a primary aperture therein, an objective lens system in said aperture, a shutter for said aperture, a first film gate located in the focal plane of said lens system, a copying lens located on the optical axis of said objective lens system behind said first film gate, a light splitter located behind and on the optical axis of said copying lens, a second film gate located in the path of light transmitted by said splitter and in the focal plane of said copying lens, a third film gate located in the path of light reflected by said splitter and at an optical distance from the copying lens corresponding to the optical distance between the copying lens and the second film gate, and a condensing lens in the path of light reflected by said splitter behind said third film gate, said casing having a wall with a viewing aperture therein located in the path of light reflected by said splitter at a point beyond said condensing lens, and means permitting a viewing through such aperture of images produced by said copying lens.

3. A camera for use in producing composite photographs comprising a casing having a primary aperture, an objective lens system covering said aperture, a field lens located behind said objective lens system, a shutter for said primary aperture, a first film gate located in the focal plane of said lens system, a copying lens on the optical axis of said lens system behind said first film gate, a light splitter located behind said copying lens and adapted to divide light passing through said copying lens and to direct it along two paths which are substantially at right angles to each other, second and third film gates located in the paths of light transmitted and reflected by said splitter at equal optical distances therefrom and in focal planes of said copying lens whereby identical images are produced by said copying lens on films located in said second and third gates, means in one of said light paths beyond the film gate therein permitting a viewing of images produced by said copying lens, and a shutter for the film gate in the other of said paths.

4. A camera for use in producing composite motion pictures comprising a casing having an objective aperture therein, an objective lens system for said aperture, a first film gate located in the focal plane of said lens system, a copying lens located behind said first film gate and optically aligned with said objective lens system, a light splitter located on the optical axis of said lens system behind said copying lens and capable of dividing light passing through said copying lens and directing it along two paths substantially at right angles to each other, second and third film gates located in the paths of light transmitted and reflected by said splitter at equal optical distances from and in focal planes of said copying lens whereby said copying lens may produce identical images on films disposed in said second and third gates, said casing having a wall with a viewing aperture located in one of the paths of light from the splitter at a point behind the film gate in that path, and means including a condensing lens located in the last mentioned path behind the film gate therein for permitting a viewing of images produced by said copying lens, a shutter for the film gate in the other of the paths of light from said splitter, film feed mechanism for each of said film gates, and means for driving said mechanisms in synchronism.

5. A camera for use in producing composite motion pictures, comprising a casing having an objective aperture therein, an objective lens system for said aperture, a shutter for said aperture, a first film gate located in the focal plane of said lens system, a light splitter located on the optical axis of said lens system behind the first mentioned film gate, a copying lens located on the optical axis of said objective lens system between said first film gate and said light splitter, a second film gate located in the path of light transmitted by said splitter, a shutter for said second film gate, a third film gate located in the path of light reflected by said splitter, said second and third film gates being located at equal optical distances from said copying lens and in focal planes thereof, whereby identical images may be produced on films disposed in said second and third film gates, a reflector surface located in the path of light reflected from the splitter at a point beyond the third mentioned film gate, said casing having a wall with a viewing aperture located in the path of light reflected from said reflector surface means permitting a viewing through such aperture of images produced by said copying lens, and means for closing such aperture when desired.

6. A camera according to claim 5, further characterized by the provision of film feeding mechanism for each of said film gates, and means for driving said mechanisms in synchronism.

OTTO JOHN LAURO SEAMAN.